United States Patent
Lee et al.

(10) Patent No.: US 12,547,567 B2
(45) Date of Patent: Feb. 10, 2026

(54) METHOD OF ALLOCATING AND PROTECTING MEMORY IN COMPUTATIONAL STORAGE DEVICE AND COMPUTATIONAL STORAGE DEVICE PERFORMING THE SAME

(71) Applicant: SAMSUNG ELECTRONICS CO., LTD., Suwon-si (KR)

(72) Inventors: Seunghan Lee, Suwon-si (KR); Sooyoung Ji, Suwon-si (KR); Seohyun Shin, Suwon-si (KR); Hyunjoon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/626,393

(22) Filed: Apr. 4, 2024

(65) Prior Publication Data
US 2025/0028662 A1    Jan. 23, 2025

(30) Foreign Application Priority Data
Jul. 20, 2023  (KR) .................. 10-2023-0094463

(51) Int. Cl.
*G06F 13/28* (2006.01)
*G06F 13/42* (2006.01)

(52) U.S. Cl.
CPC .......... *G06F 13/28* (2013.01); *G06F 13/4221* (2013.01); *G06F 2213/0026* (2013.01); *G06F 2213/28* (2013.01)

(58) Field of Classification Search
CPC .............................. G06F 13/4221; G06F 13/28
See application file for complete search history.

(56) References Cited

U.S. PATENT DOCUMENTS 11,403,044 B2    8/2022  Khan et al.
12,307,087 B2 *  5/2025  Ki .......................... G06F 3/0685
(Continued)

FOREIGN PATENT DOCUMENTS

EP    4036725 A1    8/2022
EP    4105771 A1    12/2022

OTHER PUBLICATIONS

Search Reported cited in corresponding EP Application No. EP 24177357.1, dated Nov. 20, 2024, 14 pages.

*Primary Examiner* — Tammara R Peyton
(74) *Attorney, Agent, or Firm* — Morgan, Lewis & Bockius LLP

(57) ABSTRACT

A computational storage device includes an interface exchanging a signal with a first external source, a non-volatile memory device, a storage controller, a device memory, and a computation engine. The interface receives an indirect usage request instructing the computation engine to perform a second computation for second input data from a second external source while performing a first computation for first input data acquired from the first external source. The computation engine provides the first input data and first intermediate data generated when performing the first computation to an external computational storage device in response to the indirect usage request, requests the first computation from the external computational storage device, performs the second computation for the second input data loaded from the non-volatile memory device to the device memory, and outputs second result data generated by completing the second computation to the second external source through the interface.

20 Claims, 15 Drawing Sheets

(56) References Cited

U.S. PATENT DOCUMENTS

| | | |
|---|---|---|
| 2007/0204270 A1 | 8/2007 | Shin |
| 2018/0357005 A1 | 12/2018 | Lee et al. |
| 2020/0183582 A1 | 6/2020 | Kachare et al. |
| 2022/0197704 A1 | 6/2022 | Gibb et al. |
| 2022/0236902 A1 | 7/2022 | Pinto et al. |
| 2022/0357890 A1 | 11/2022 | Pinto et al. |
| 2022/0365716 A1 | 11/2022 | Yoon et al. |
| 2022/0405015 A1 | 12/2022 | Lee |
| 2023/0024949 A1 | 1/2023 | Ammari et al. |
| 2023/0042551 A1 | 2/2023 | Pinto et al. |
| 2024/0220150 A1* | 7/2024 | Eun ................. G06F 3/0604 |

* cited by examiner

METHOD OF ALLOCATING AND PROTECTING MEMORY IN COMPUTATIONAL STORAGE DEVICE AND COMPUTATIONAL STORAGE DEVICE PERFORMING THE SAME

CROSS-REFERENCE TO RELATED APPLICATION(S)

This application claims priority under 35 U.S.C. § 119 to Korean Patent Application No. 10-2023-0094463, filed on Jul. 20, 2023 in the Korean Intellectual Property Office, the disclosure of which is incorporated by reference herein in its entirety.

TECHNICAL FIELD

Embodiments of the present inventive concept relate to a computational storage device, and a method of operating a computation system including the computational storage device.

DISCUSSION OF RELATED ART

A general storage device has a function of storing data under control of a host device. Recently, in order to reduce a computational burden of the host device, a computational storage device (CSD) supporting various computational operations or various applications within the storage device has been developed.

The computational storage device may include one or more processing resources capable of processing data. The computational storage device may have at least two usage models. For example, the computational storage device may have a direct usage model for receiving data from a host and processing the received data in response to a request from the host, and an indirect usage model for loading data in the computational storage device in response to a request from the host and processing the loaded data.

SUMMARY

An aspect of embodiments of the present inventive concept is to provide a computational storage device and a method of operating a computation system, which may provide rapid responses to computational requests by efficiently using processing resources.

According to an aspect of the present inventive concept, a computational storage device includes an interface that exchanges a signal with a first external source, a non-volatile memory device, a storage controller that controls the non-volatile memory device, a device memory, and a computation engine that processes data loaded on the device memory. The interface receives an indirect usage request instructing the computation engine to perform a second computation for second input data stored in the non-volatile memory device from a second external source while performing a first computation for first input data acquired from the first external source, and the computation engine provides the first input data and first intermediate data generated when performing the first computation to an external computational storage device, different from the computational storage device, in response to the indirect usage request, requests the first computation from the external computational storage device, performs the second computation for the second input data loaded from the non-volatile memory device to the device memory, and outputs second result data generated by completing the second computation to the second external source through the interface.

According to an aspect of the present inventive concept, a computational storage device includes an interface that exchanges a signal with a first external source, a non-volatile memory device, a storage controller that controls the non-volatile memory device, a device memory, and a computation engine that processes data loaded on the device memory. The interface receives an indirect usage request instructing the computation engine to perform a second computation for second input data stored in the non-volatile memory device from a second external source while performing a first computation for first input data acquired from the first external source, and the computation engine stops the first computation in response to the indirect usage request, performs the second computation for the second input data loaded from the non-volatile memory device to the device memory, outputs result data generated by completing the second computation to the second external source through the interface, and resumes the stopped first computation.

According to an aspect of the present inventive concept, a method of operating a computation system includes receiving first input data and a direct usage request from a first host by a first computational storage device, and performing a first computation for the first input data in response to the direct usage request. The method further includes receiving an indirect usage request for second input data stored in a non-volatile memory device of the first computational storage device from a second host while performing the first computation by the first computational storage device. The method further includes providing the first input data, first intermediate data generated when performing the first computation, and request information for the direct usage request to a second computational storage device in response to the indirect usage request by the first computational storage device, loading the second input data from the non-volatile memory device, performing a second computation for the loaded second input data, and providing second result data generated in completing the second computation to the second host. The method further includes performing the first computation for unprocessed data among the first input data based on the request information and the first input data by the second computational storage device, generating first result data by accumulating a first computation result on the unprocessed data to the first intermediate data, and providing the first result data to the first host.

BRIEF DESCRIPTION OF DRAWINGS

The above and other features of the present inventive concept will become more apparent by describing in detail embodiments thereof with reference to the accompanying drawings, in which.

DETAILED DESCRIPTION

Figure 1:
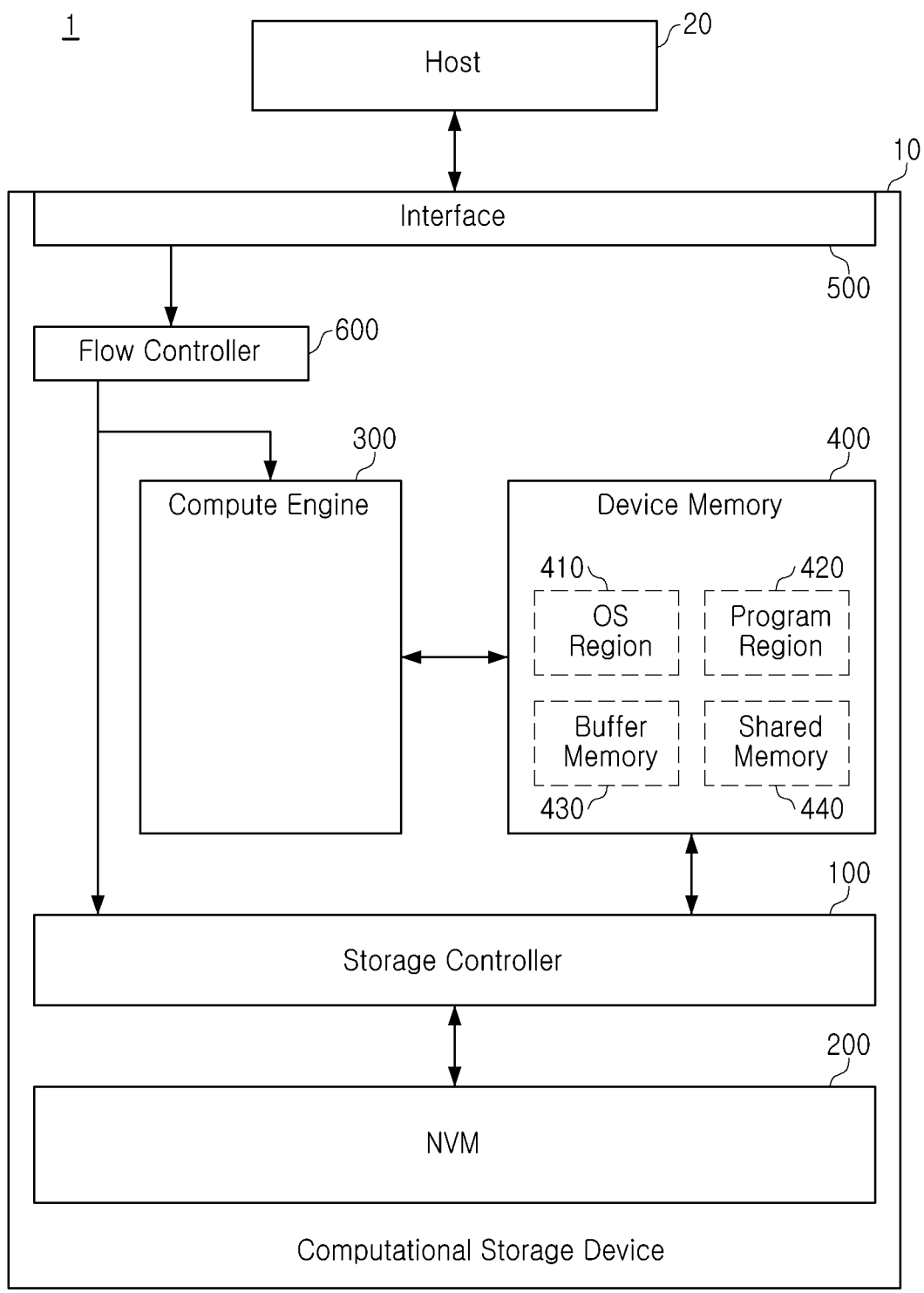
FIG. 1 is a block diagram illustrating a computation system according to an embodiment.

Embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a" "an" and "the" are intended to include the plural forms as well, unless the context clearly indicates otherwise.

FIG. 1 is a block diagram illustrating a computation system according to an embodiment.

Referring to FIG. 1, a computation system 1 may include a computational storage device 10 and a host 20. In an embodiment, the computation system 1 may be included in a user device such as, for example, a personal computer, a laptop computer, a server, a media player, a digital camera, or the like, or an automotive device such as, for example, a navigation system, a black box, an electric/electronic device for a vehicle, or the like. In an embodiment, the computation system 1 may be a mobile system such as, for example, a portable communication terminal (mobile phone), a smartphone, a tablet PC, a wearable device, a healthcare device, or an Internet-of-Things (IoT) device.

The host 20 may control an overall operation of the computation system 1. The computational storage device 10 may store data or perform a computation on the data, in response to a request from the host 20. For example, the host 20 may offload a processing task to the computational storage device 10. The computational storage device 10 may execute a program for performing the processing task, and may provide result data generated in executing the program to the host 20.

The computational storage device 10 may include a storage controller 100, a non-volatile memory device 200, a computation engine 300 (also referred to as a compute engine), a device memory 400, an interface 500, and a flow controller 600. The storage controller 100 may also be referred to as a storage controller circuit, the computation engine 300 may also be referred to as a computation engine circuit, and the flow controller 600 may also be referred to as a flow controller circuit.

The computational storage device 10 may include a storage medium for storing data according to a request from the host 20. For example, the computational storage device 10 may include a solid state drive (SSD). When the computational storage device 10 includes an SSD, the SSD may follow a non-volatile memory express (NVMe) standard.

The storage medium may include the storage controller 100 and the non-volatile memory device 200. The storage controller 100 may control an operation of the non-volatile memory device 200, and may manage the non-volatile memory device 200. For example, the storage controller 100 may provide data, which will be stored in the non-volatile memory device 200, to the non-volatile memory device 200, or may receive data read from the non-volatile memory device 200.

When the non-volatile memory device 200 include a flash memory, the flash memory may include a 2D NAND memory array or a 3D (or vertical) NAND (VNAND) memory array. As another example, the non-volatile memory device 200 may include a magnetic RAM (MRAM), a spin-transfer torque MRAM, a conductive bridging RAM (CBRAM), a ferroelectric RAM (eRAM), a phase RAM (PRAM), and a resistive memory (resistive RAM), and various other types of memory.

The computational storage device 10 may include at least one computation engine 300 for processing data according to a request from the host 20. In an embodiment, the computation engine 300 may include a field programmable gate array (FPGA), a graphics processing unit (GPU), or the like.

The computation engine 300 may perform various types of computation, calculations, or the like. For example, the computation engine 300 may perform at least a portion of various programs or functions such as, for example, compression, a database filter, encryption, erasure coding, deduplication, scatter-gather, a pipeline, a redundant array of independent disks (RAID), a regular expression, or the like.

In an embodiment, a program may be referred to as a computational storage function (CSF). The CSF may define a set of operations that may be executed in the computation engine 300. For example, the CSF may define any one of the various programs described above.

The computation engine 300 may perform computation without intervention of the host 20. For example, the computational storage device 10 may perform a computation on data using the computation engine 300 without providing the data stored in the non-volatile memory device 200 to the host 20. In addition, the computational storage device 10 may provide result data to the host 20. Therefore, a computation of the computation system 1 may be offloaded to the computational storage device 10, and a data bottleneck phenomenon of the computation system 1 may be alleviated.

The device memory 400 may store data related to an operation of the computational storage device 10. The device memory 400 may include an operating system (OS) region 410, a program region 420, a buffer memory 430, and a shared memory 440.

An OS for controlling an overall operation of the computational storage device 10 may be loaded in the OS region 410. Programs that may be executed by the computation engine 300 may be loaded into the program region 420. For example, the program region 420 may include a plurality of program slots.

Data to be stored in the non-volatile memory device 200 or data to be processed in the computation engine 300 may be stored in the buffer memory 430. Additionally, data output from the non-volatile memory device 200 or data processed by the computation engine 300 may be stored in the buffer memory 430.

The interface 500 may provide interfacing between the computational storage device 10 and the host 20, based on a protocol defined by a standard such as, for example, a peripheral component interconnect express (PCIe), a compute express link (CXL), or the like. For example, the interface 500 may receive a packet defined in the protocol from the host 20. The packet may contain a request or data associated with the request.

The flow controller 600 may provide requests received through the interface 500 to the storage controller 100 or the computation engine 300. For example, a storage request provided to the storage controller 100 and a computation request provided to the computation engine 300 may have different formats. The flow controller 600 may divide requests received through the interface 500 into a storage request and a computation request, based on a format of the requests, may provide the storage request to the storage controller 100, and may provide the computation request to the computation engine 300.

In an embodiment, the storage controller 100 and the computation engine 300 may be implemented as separate chips. When the storage controller 100 and the computation engine 300 are implemented as separate chips, the flow controller 600 may also be implemented as a separate chip such as, for example, a PCIe bridge. However, embodiments of the present inventive concept are not limited thereto, and the storage controller 100, the computation engine 300, and the flow controller 600 may be integrated into a chip according to embodiments.

The computational storage device 10 may provide a plurality of usage models to the host 20. For example, the plurality of usage models may include a direct usage model and an indirect usage model. The direct usage model may refer to a usage model in which the computational storage device 10 processes data provided together with a command from the host 20 and provides a response to the command to the host 20. In addition, the indirect usage model may refer to a usage model in which the computational storage device 10 processes data stored in the non-volatile memory device 200 in response to a command from the host 20 and provides a response to the command to the host 20.

Since the computational storage device 10 may provide the plurality of usage models, the host 20 may effectively offload a computation on data held by the host 20 and a computation on data stored in the computational storage device 10, to the computational storage device 10.

Hereinafter, a request instructing the computational storage device 10 to perform a computation on data provided from the host 20 according to the direct usage model may be referred to as a direct usage request. Additionally, a request instructing the computational storage device 10 to perform a computation on data stored in the computational storage device 10 according to the indirect usage model may be referred to as an indirect usage request.

To effectively offload a plurality of computations, the computation system 1 may include a plurality of computational storage devices supporting the direct usage request and the indirect usage request. The direct usage request may be processed on a computational storage device capable of performing a requested computation, while the indirect usage request may only be processed on a specific computational storage device in which data to be computed in response to the indirect usage request is stored. As the computational storage device that may process the indirect usage request is limited, it may be difficult to efficiently use processing resources of the plurality of computational storage devices.

According to an embodiment, when the direct usage request and the indirect usage request compete in the computational storage device, the computational storage device may first process the indirect usage request and may provide the direct usage request to a different computational storage device, whereby the indirect usage request and the direct usage request may be processed quickly, and the processing resources of the computational storage devices may be used efficiently.

Hereinafter, before an operation of a computation system according to an embodiment is described in detail, usage models of a computational storage device will be described in detail.

Figure 2:
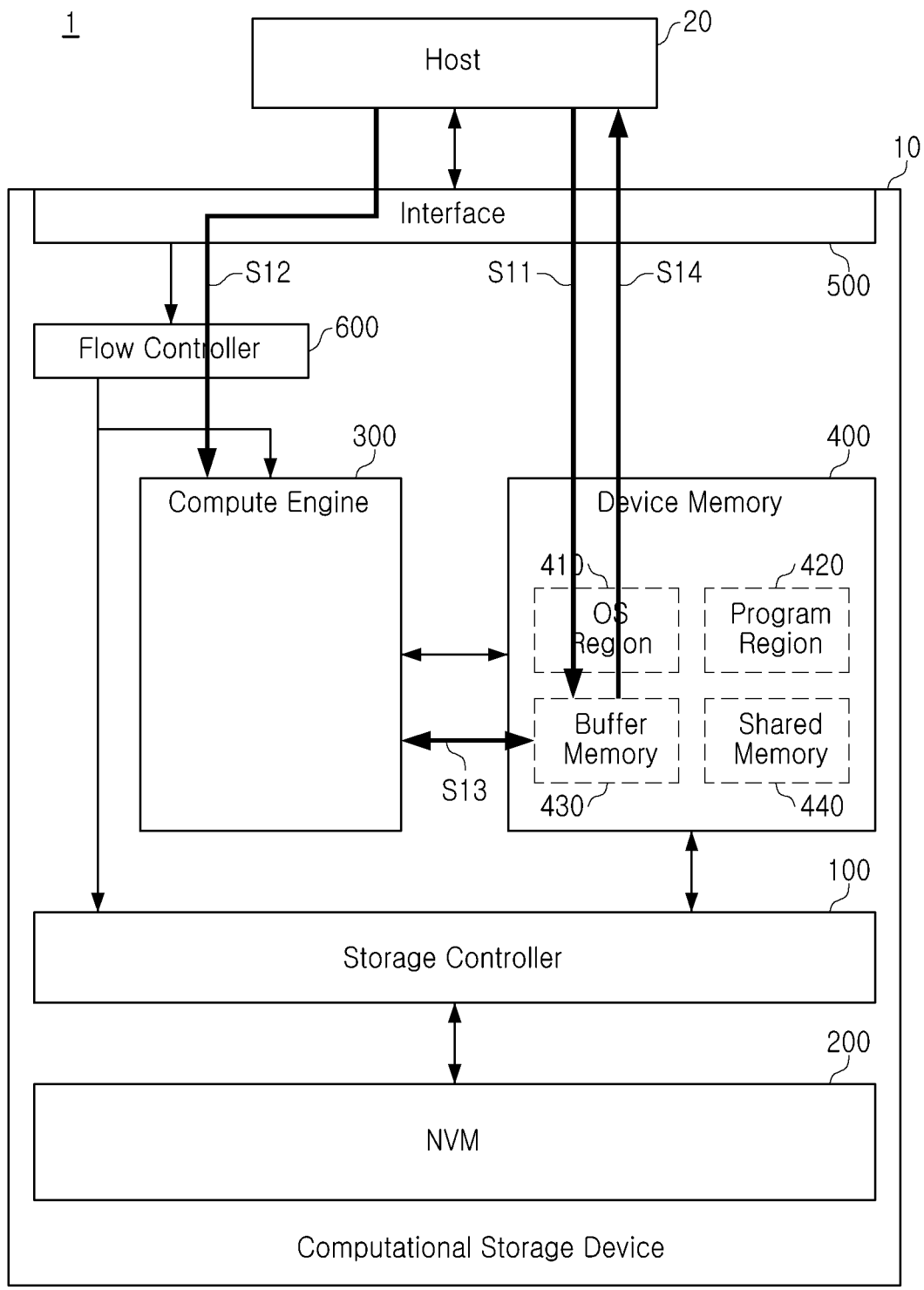
FIGS. 2 and 3 are block diagrams illustrating a usage model of a computational storage device according to an embodiment.
Figure 3:
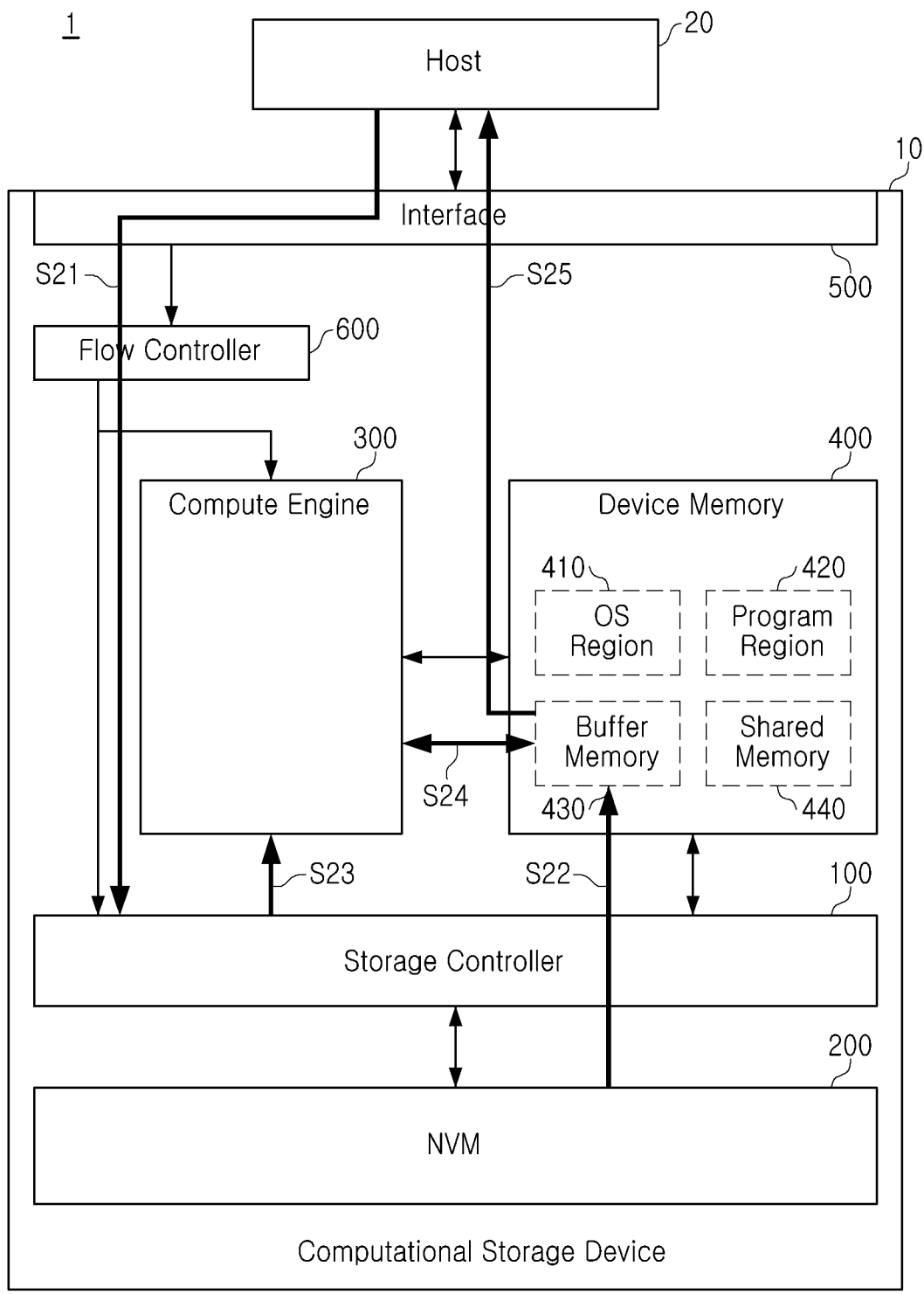

FIGS. 2 and 3 are block diagrams illustrating a usage model of a computational storage device according to an embodiment.

FIG. 2 illustrates an operation of a computation system according to a direct usage model. A computation system 1 of FIG. 2 may correspond to the computation system 1 described with reference to FIG. 1.

In operation S11, the host 20 may provide input data related to a computation to be offloaded to the computational storage device 10, to the computational storage device 10. The computational storage device 10 may store the input data provided from the host 20 in an allocated region of the buffer memory 430. The region allocated to store data related to the computation may be referred to as an allocated function data memory (AFDM).

In operation S12, the host 20 may provide a computation request indicating a target program to be executed to perform the computation, to the computational storage device 10.

For example, to request the computational storage device 10 to perform a filtering computation on input data, the host 20 may provide a computation request indicating a database filter program to the computational storage device 10. The computation request may further indicate an address of a host memory region for storing result data generated by performing a computation on the input data. The flow controller 600 may provide the computation request received through the interface 500 to the computation engine 300.

In operation S13, the computation engine 300 may execute the target program indicated in the computation request, to perform a computation on input data stored in the allocated region of the buffer memory 430. The computation engine 300 may store result data generated by completing the computation on the input data in the buffer memory 430.

In operation S14, the computation engine 300 may provide the result data stored in the buffer memory 430 to the host 20. For example, the computation engine 300 may provide the result data to the host 20 by providing the result data to the host memory region through the interface 500.

Since the computational storage device 10 supports a direct usage model, the host 20 may offload a computation on input data held by the host 20 to the computational storage device 10.

FIG. 3 illustrates an operation of a computation system according to an indirect usage model. A computation system 1 of FIG. 3 may correspond to the computation system 1 described with reference to FIG. 1.

In operation S21, the host 20 may provide a storage request to the computational storage device 10. The storage request may indicate an address of data stored in the computational storage device 10, for example, a logical block address. Additionally, the storage request may be associated with a target program corresponding to a computation to be performed on data stored in the computational storage device 10.

In operation S22, a storage controller 100 may acquire the storage request through the interface 500, and may load input data stored in the non-volatile memory device 200 into the buffer memory 430 in response to the storage request.

For example, the storage controller 100 may specify a region in which input data of the non-volatile memory device 200 is stored by interpreting the storage request. Additionally, the storage controller 100 may store input data stored in the non-volatile memory device 200 in a region allocated to perform the target program in the buffer memory 430.

In operation S23, the storage controller 100 may provide a command instructing the computation engine 300 to perform a computation on the input data by executing a target program. For example, the storage controller 100 may interpret the storage request to specify a target program associated with the storage request, and may provide a command instructing the computation engine 300 to execute the target program on data stored in the allocated region.

In operation S24, the computation engine 300 may perform a computation on the input data by executing the target program, and store result data generated by completing the computation in an allocated region of the buffer memory 430.

In operation S25, the storage controller 100 may provide the result data to the host 20 through the interface 500.

Since the computational storage device 10 supports an indirect usage model, the host 20 may request to perform a computation on data stored in the computational storage device 10 by the computational storage device 10 itself, without a need to load the data to the host 20, to acquire only output data. Therefore, a data bottleneck phenomenon of the computation system 1 may be alleviated.

The computation system may include a plurality of hosts and a plurality of computational storage devices. According to an embodiment, the computational storage device may schedule a direct usage request and an indirect usage request, which are competing, such that the plurality of hosts may efficiently use processing resources provided by the plurality of computational storage devices.

Figure 4:
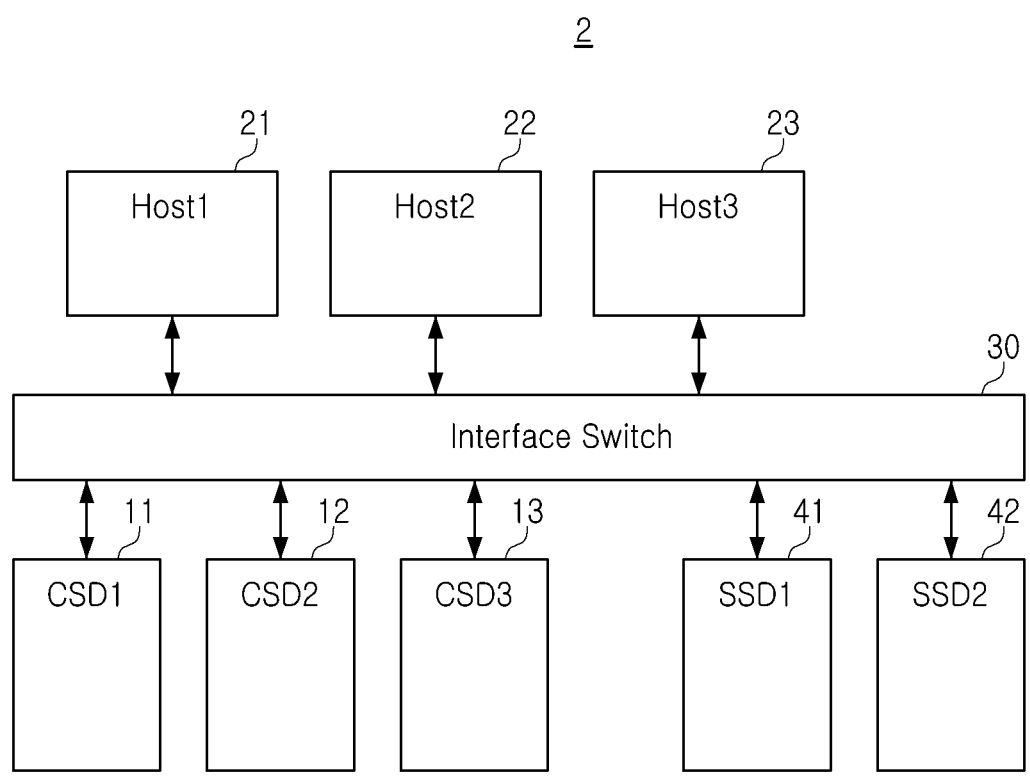
FIG. 4 is a block diagram illustrating a computation system according to an embodiment.

FIG. 4 is a block diagram illustrating a computation system according to an embodiment.

Referring to FIG. 4, a computation system 2 may include a plurality of computational storage devices 11 to 13, a plurality of hosts 21 to 23, and an interface switch 30. In an embodiment, the computation system 2 may further include a plurality of storage devices 41 and 42.

Each of the plurality of computational storage devices 11 to 13 may correspond to the computational storage device 10 described with reference to FIG. 1. Each of the plurality of hosts 21 to 23 may correspond to the host 20 described with reference to FIG. 1. In an embodiment, each of the plurality of hosts 21 to 23 may include a host processor and a host memory. For example, when the plurality of hosts 21 to 23 are virtual machines, the host processor and the host memory may be resources abstracted from a physical processor and a physical memory, respectively.

When the plurality of hosts 21 to 23 are virtual machines, a processor may entirely control a function and an operation of the computation system 2. For example, a processor may control the computation system 2 by executing a host OS. A memory may store data utilized for execution of the plurality of hosts 21 to 23. For example, a memory may load the host OS, and may store data processed in the computation system 2.

The processor may run a hypervisor on the host OS. The hypervisor may abstract a physical resource such as a processor or a memory, and may provide the abstracted physical resource to the plurality of hosts 21 to 23 as a virtual device including a host processor and a host memory. Each of the plurality of hosts 21 to 23 may execute a guest OS using the virtual device, and may execute at least one application on the guest OS.

The interface switch 30 may perform interfacing between the plurality of hosts 21 to 23 and input/output devices based on a designated protocol. For example, the interface switch 30 may include a PCIe switch, a CXL switch, or the like. The input/output devices may include the plurality of computational storage devices 11 to 13 and, in an embodiment, may further include the plurality of storage devices 41 and 42.

The plurality of hosts 21 to 23 may offload a computation on data by providing a direct usage request and an indirect usage request to the plurality of computational storage devices 11 to 13 through the interface switch 30. The direct usage request may be a request for data stored in the host, and may thus be processed by any of the plurality of computational storage devices 11 to 13. The indirect usage request may be a request for data stored in a specific computational storage device, and may thus be processed only in the specific computational storage device.

When a first computational storage device 11 receives an indirect usage request that may only be processed by the first computational storage device 11 while processing a direct usage request, and the indirect usage request is processed after processing of the direct usage request is completed, it may be difficult for processing resources of the plurality of computational storage devices 11 to 13 to be used efficiently. For example, processing of the indirect usage request may be delayed until processing of the direct usage request may be completed, and second and third computational storage devices 12 and 13 may remain in an idle state, unless other requests are processed.

According to an embodiment, when the first computational storage device 11 receives an indirect usage request while processing a direct usage request, processing of the direct usage request may stop and processing of the indirect usage request may be performed. In addition, the first computational storage device 11 may provide a request to the second computational storage device 12 or the third computational storage device 13 to process the stopped direct usage request.

According to an embodiment, when a direct usage request and an indirect usage request compete in the first computational storage device 11, the indirect usage request that may be processed only by the first computational storage device 11 may be quickly processed. In addition, since the direct usage request may be processed in a computational storage device, which is in an idle state, the processing resources of the computational storage devices 11 to 13 may be used efficiently.

Hereinafter, a method of operating a computation system according to an embodiment will be described in more detail with reference to FIGS. 5 to 15.

Figure 5:
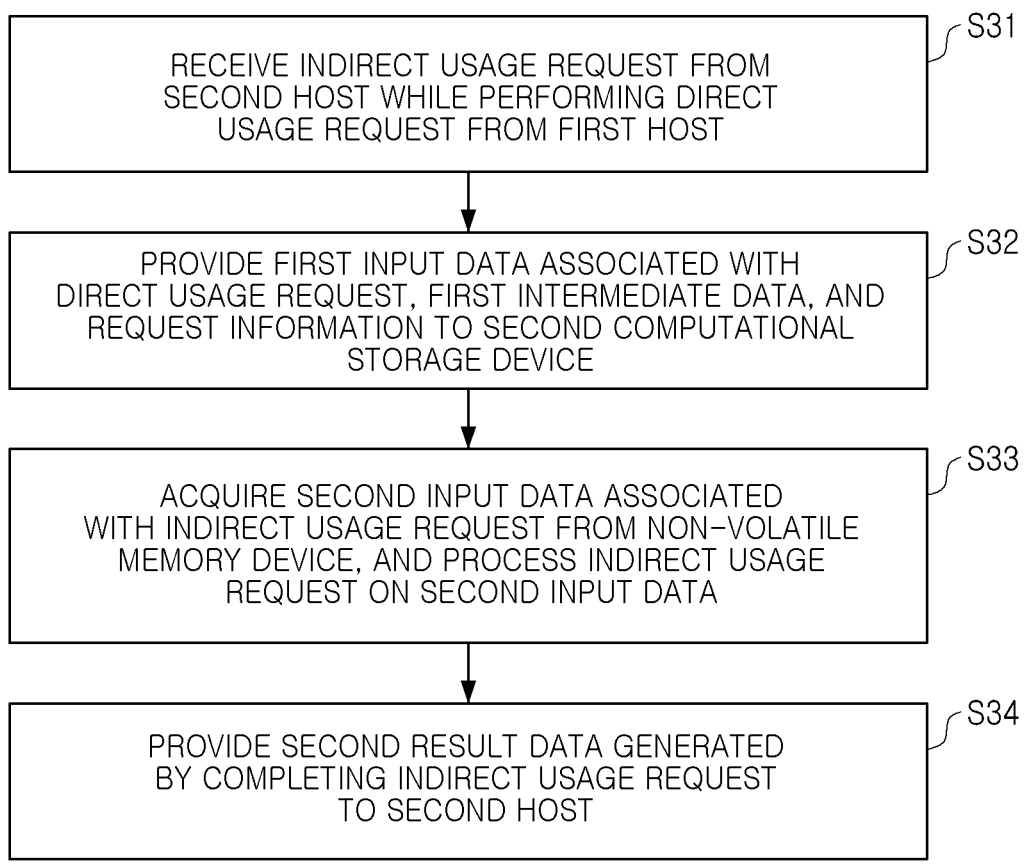
FIG. 5 is a flowchart illustrating an operation of a computational storage device according to an embodiment.

FIG. 5 is a flowchart illustrating an operation of a computational storage device according to an embodiment. For example, an operation illustrated in FIG. 5 may be performed in a first computational storage device 11, as described with reference to FIG. 4.

Referring to FIG. 5, in operation S31, the first computational storage device 11 may receive an indirect usage request from the second host 22 while performing a first computation according to a direct usage request from the first host 21. Operation S31 is illustrated in detail with reference to FIG. 6.

In operation S32, the first computational storage device 11 may stop the first computation, which is being performed, and may provide first input data associated with the direct usage request, first intermediate data generated in performing the direct usage request, and request information for the direct usage request to that second computational storage device 12. The operation S32 is illustrated in detail with reference to FIGS. 7 and 8.

In operation S33, the first computational storage device 11 may acquire second input data associated with the indirect usage request from a non-volatile memory device included in the first computational storage device 11, and may process the indirect usage request by performing a second computation on the second input data. The operation S33 is illustrated in detail with reference to FIG. 9.

In operation S34, the first computational storage device 11 may provide second result data generated by completing the indirect usage request to the second host 22. The operation S34 is illustrated in detail with reference to FIG. 10.

FIGS. 6 to 10 are block diagrams illustrating an operation of a computation system according to an embodiment.

Figure 6:
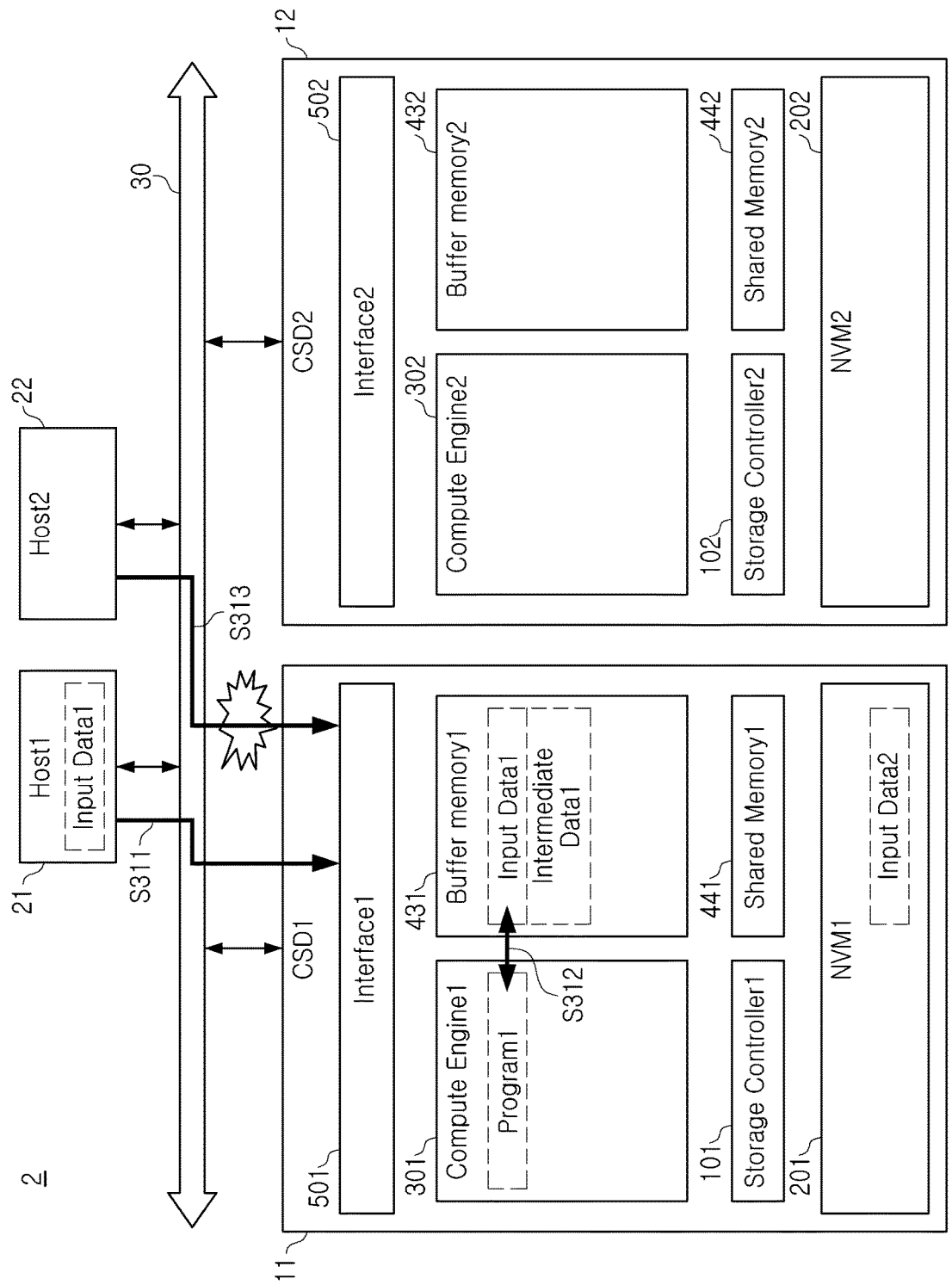
FIGS. 6 to 10 are block diagrams illustrating an operation of a computation system according to an embodiment.

FIG. 6 illustrates a portion of a configuration of the computation system 2, as described with reference to FIG. 4. FIG. 6 illustrates the first host 21, the second host 22, the first computational storage device 11, the second computational storage device 12, and the interface switch 30.

The first computational storage device 11 may include a first storage controller 101, a first non-volatile memory device 201, a first computation engine 301, a first buffer memory 431, a first shared memory 441, and a first interface 501. In addition, the second computational storage device 12 may include a second storage controller 102, a second non-volatile memory device 202, a second computation engine 302, a second buffer memory 432, a second shared memory 442, and a second interface 502.

Operations S311 to S313 of FIG. 6 may be related to operation S31 described with reference to FIG. 5.

In operation S311, the first host 21 may provide a direct usage request and first input data Input Data1 to the first computational storage device 11. For example, when the first host 21 wants to request the first computational storage device 11 to perform a filtering computation on the first input data, the direct usage request may indicate a database filter program.

The first interface 501 may store the first input data from the first host 21 in an allocated region of the first buffer memory 431, and may provide the direct usage request from the first host 21 into the first computation engine 301.

In operation S312, the first computation engine 301 may perform a first computation for the first input data stored in the allocated region of the first buffer memory 431. For example, the first computation engine may perform the filtering computation on the first input data by executing the database filter program in response to the direct usage request. In FIG. 6, a program for performing the first computation is illustrated as a first program Program1.

First intermediate data Intermediate Data1 generated when performing the first computation by the first computation engine 301 may be stored in the allocated region of the first buffer memory 431. For example, when performing the filtering computation on the first input data including a plurality of records, it may be sequentially checked whether each of the records meets a filtering condition, and a record matching the filtering condition may be stored in a separate region, distinguished from the input data. In performing the filtering computation, e.g., when records for which no filtering computation has been performed remain, records stored in the separate region may be referred to as first intermediate data.

While the first computational storage device 11 processes the direct usage request from the first host 21, the second host 22 may provide an indirect usage request to the first computational storage device 11 in operation S313. The indirect usage request may be a request instructing to perform a second computation for second input data Input Data2 stored in the first non-volatile memory device 201.

According to an embodiment, the first computational storage device 11 may move the direct usage request, which is performing, to the second computational storage device 12 in response to the indirect usage request from the second host 22, and may perform the indirect usage request.

For example, the first interface 501 may provide an interrupt signal to the first computation engine 301 in response to the indirect usage request, and may provide the indirect usage request to the first storage controller 101. The first computation engine 301 may stop the direct usage request in response to the interrupt signal, and may move the stopped direct usage request to the second computational storage device 12.

The second computational storage device 12 may be a device equipped with a program for executing the direct usage request. The equipping with a program in the second computational storage device 12 may indicate that the program is installed by a supplier or downloaded by a user, and stored in the second non-volatile memory device 202 or the like. For example, when the direct usage request is a filtering request, the second computational storage device 12 may be selected from among computational storage devices equipped with the database filtering program.

Figure 7:
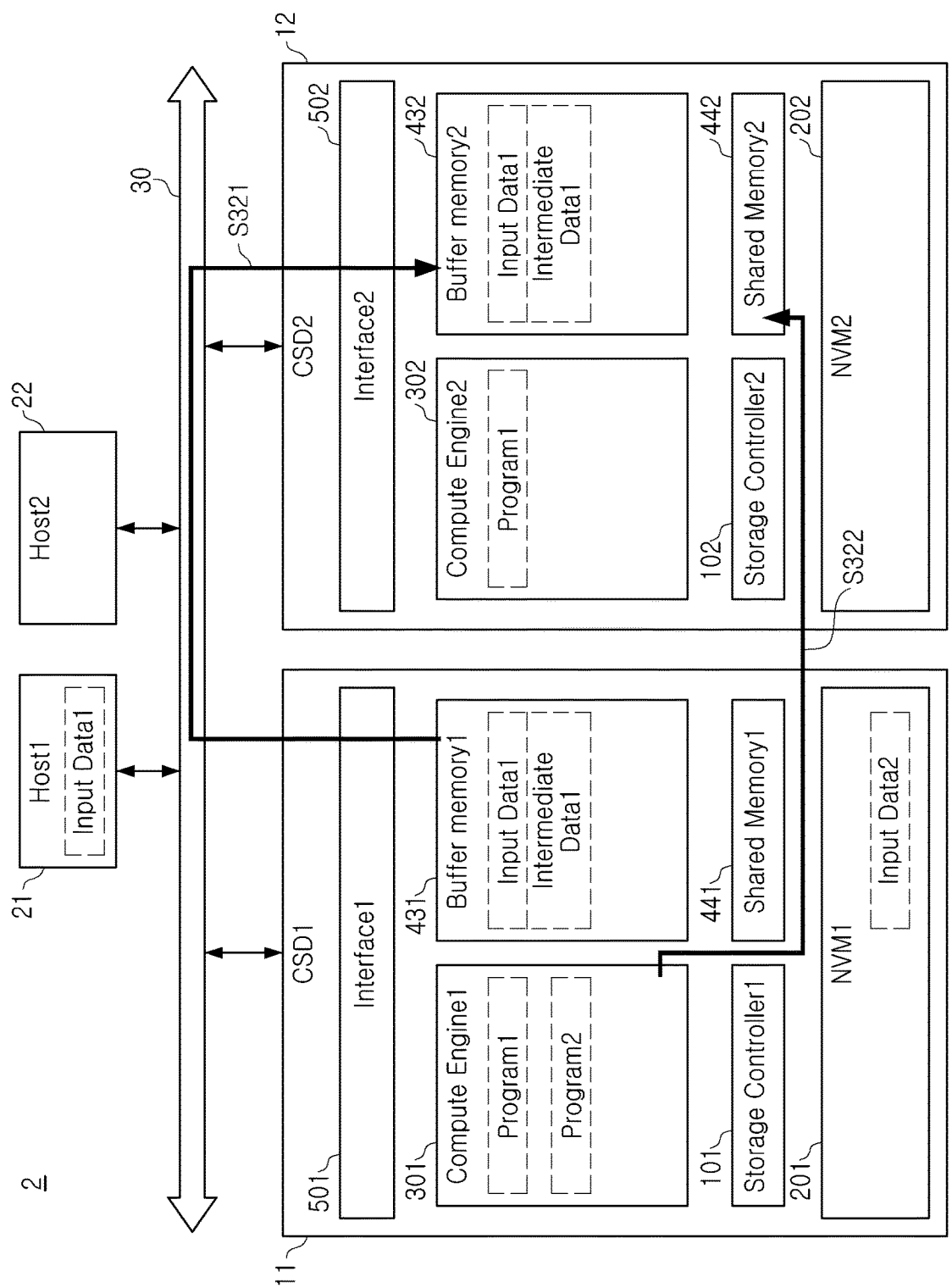

FIG. 7 illustrates the computation system 2, as described with reference to FIG. 6.

Operations S321 and S322 of FIG. 7 may be related to operation S32 described with reference to FIG. 5. The first computational storage device 11 may perform operations S321 and S322 to move a direct usage request to the second computational storage device 12.

Referring to FIG. 7, in operation S321, the first computational storage device 11 may move first input data and first intermediate data stored in the first buffer memory 431 to the second buffer memory 432 of the second computational storage device 12.

According to an embodiment, to move data to the second computational storage device 12, the first computational storage device 11 may perform a direct memory access (DMA) in a peer-to-peer (P2P) method defined in a standard such as, for example, PCIe, CXL, or the like.

For example, a first computation engine 301 may include a DMA engine. The first computation engine 301 may use the DMA engine, to provide the first input data and the first intermediate data stored in the first buffer memory 431 to the second buffer memory 432 without intervention or control of the first host 21. For example, the first input data and the first intermediate data may move through the interface switch 30.

In an embodiment, the first computation engine 301 may provide a P2P command to the second computational storage device 12. The P2P command may indicate a source region for storing the first input data and the first intermediate data in the first buffer memory 431, and a destination region for storing the first input data and the first intermediate data in the second buffer memory 432. The source region and the destination region may be expressed by their respective starting addresses and sizes.

In response to the P2P command, the second computational storage device 12 may acquire the first input data and the first intermediate data from the first buffer memory 431, and may store data acquired in the destination region of the second buffer memory 432.

The first computational storage device 11 may transmit not only data for performing a computation but also information related to a direct computation request to the second computational storage device 12.

In operation S322, the first computational storage device 11 may transmit request information indicating a target program of the direct computation request, a host memory region in which result data of the direct computation request is stored, and the destination region of the second buffer memory 432 in which the first input data and the first intermediate data are stored.

In an embodiment, the first computational storage device 11 may transmit the request information using the second shared memory 442 of the second computational storage device 12. The first computational storage device 11 may store the request information in the second shared memory 442 without intervention or control of the first host 21. In an embodiment, the first computational storage device 11 may access the second shared memory 442 through the interface switch 30 that operates based on a protocol defined in a standard such as, for example, PCIe, CXL, or the like.

The second computational storage device 12, which has acquired first input data, first intermediate data, and request information, may verify validity of the first intermediate data based on the request information. For example, validity of the first intermediate data may be verified by the second computation engine 302.

Figure 8:
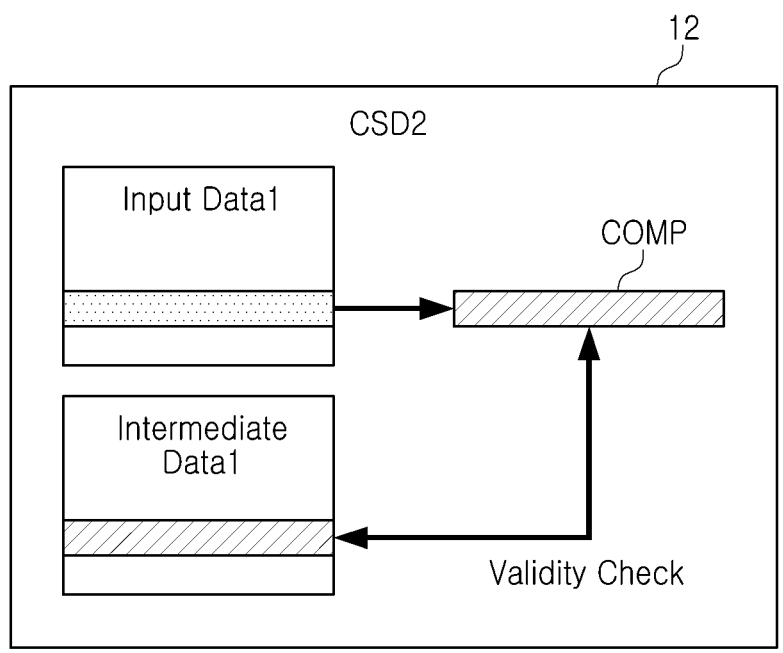

FIG. 8 is a block diagram illustrating a method by which the second computational storage device 12 verifies validity of first intermediate data.

Referring to FIG. 8, the second computational storage device 12 may verify validity of first intermediate data by executing a target program determined based on the request information for a portion of first input data, to generate comparison data COMP, and comparing a portion of the first intermediate data corresponding to the comparison data COMP and the comparison data COMP.

For example, the first input data may include data processed by a first computational storage device 11, and unprocessed data. When the target program is a database filtering program, the second computation engine 302 may perform a filtering computation on a portion of the processed data to generate comparison data COMP, and may determine whether the comparison data COMP matches records included in the first intermediate data, to verify validity of the first intermediate data.

In an embodiment, the second computation engine 302 may perform a hash computation such as a cyclic redundancy check (CRC) on the comparison data COMP to generate a first hash value. Additionally, the second computation engine 302 may perform a hash computation on a portion of the first intermediate data corresponding to the comparison data COMP to generate a second hash value. The second computation engine 302 may compare the first hash value and the second hash value to verify validity of the first intermediate data.

When it is determined that the first intermediate data is valid, the second computational storage device 12 may perform a computation on unprocessed data among the first input data to complete a direct usage request for the first input data. When it is determined that the first intermediate data is invalid, the second computational storage device 12 may perform a computation on processed data from the first input data again.

Figure 9:
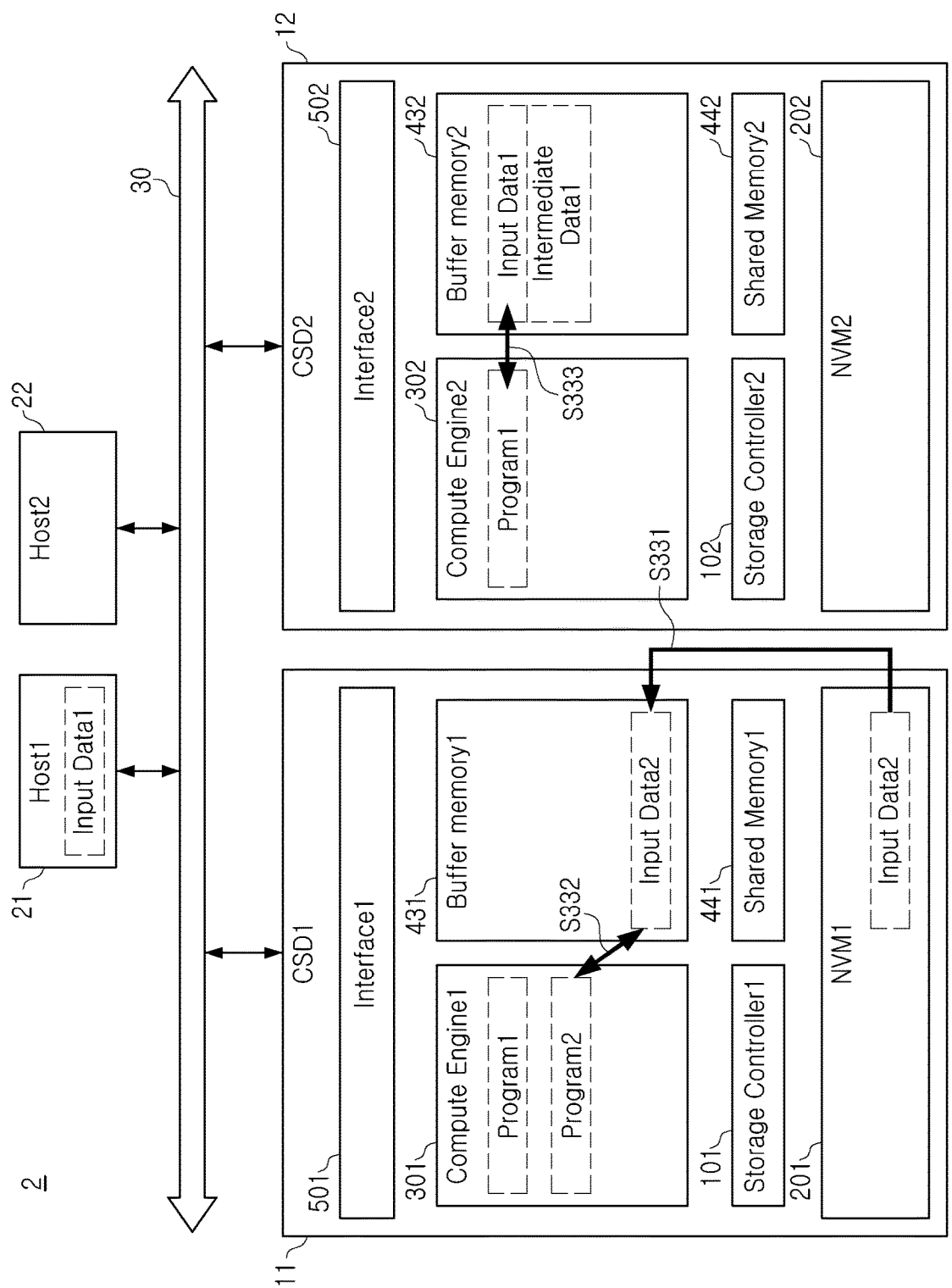

FIG. 9 illustrates the computation system 2, as described with reference to FIG. 6.

Operations S331 to S333 of FIG. 9 may be related to operation S33 described with reference to FIG. 5. Referring to FIG. 9, the first computational storage device 11 may perform an indirect usage request from the second host 22, and the second computational storage device 12 may perform a direct usage request from the first computational storage device 11.

In operation S331, second input data Input Data2 for processing the indirect usage request may be loaded from the first non-volatile memory device 201 to an allocated region of the first buffer memory 431. As described with reference to FIG. 3, the indirect usage request may be a storage request associated with a target program. A first storage controller 101 may load second input data stored in the first non-volatile memory device 201 into the allocated region, in response to an indirect usage request transmitted from the interface 501. Additionally, the first storage controller 101 may provide a command for the first computation engine 301 to execute a target program.

In operation S332, the first computation engine 301 may execute a target program for processing an indirect usage request. For example, a target program may be a decryption program. In FIG. 9, a target program is illustrated as a second program Program2. The first computation engine 301 may perform a second computation for second input data stored in an allocated region of the first buffer memory 431 by executing the target program. Data generated by performing a second computation for the second input data may be stored in a separate region from the second input data of the first buffer memory 431.

In operation S333, the second computation engine 302 may perform a computation on first input data stored in an allocated region of the second buffer memory 432 by executing a first program. For example, the second computation engine 302 may execute a first program with reference to request information from the first computational storage device 11. Additionally, the second computation engine 302 may perform a computation on unprocessed data that has not been computed by the first computational storage device 11 among the stored first input data. Additionally, data generated by performing a computation on unprocessed data may be accumulated in first intermediate data stored in the allocated region.

The operations S331 and S332 of the first computational storage device 11 and the operation S333 of the second computational storage device 12 may be executed in parallel. Therefore, processing resources of a plurality of computational storage devices may be used efficiently.

Figure 10:
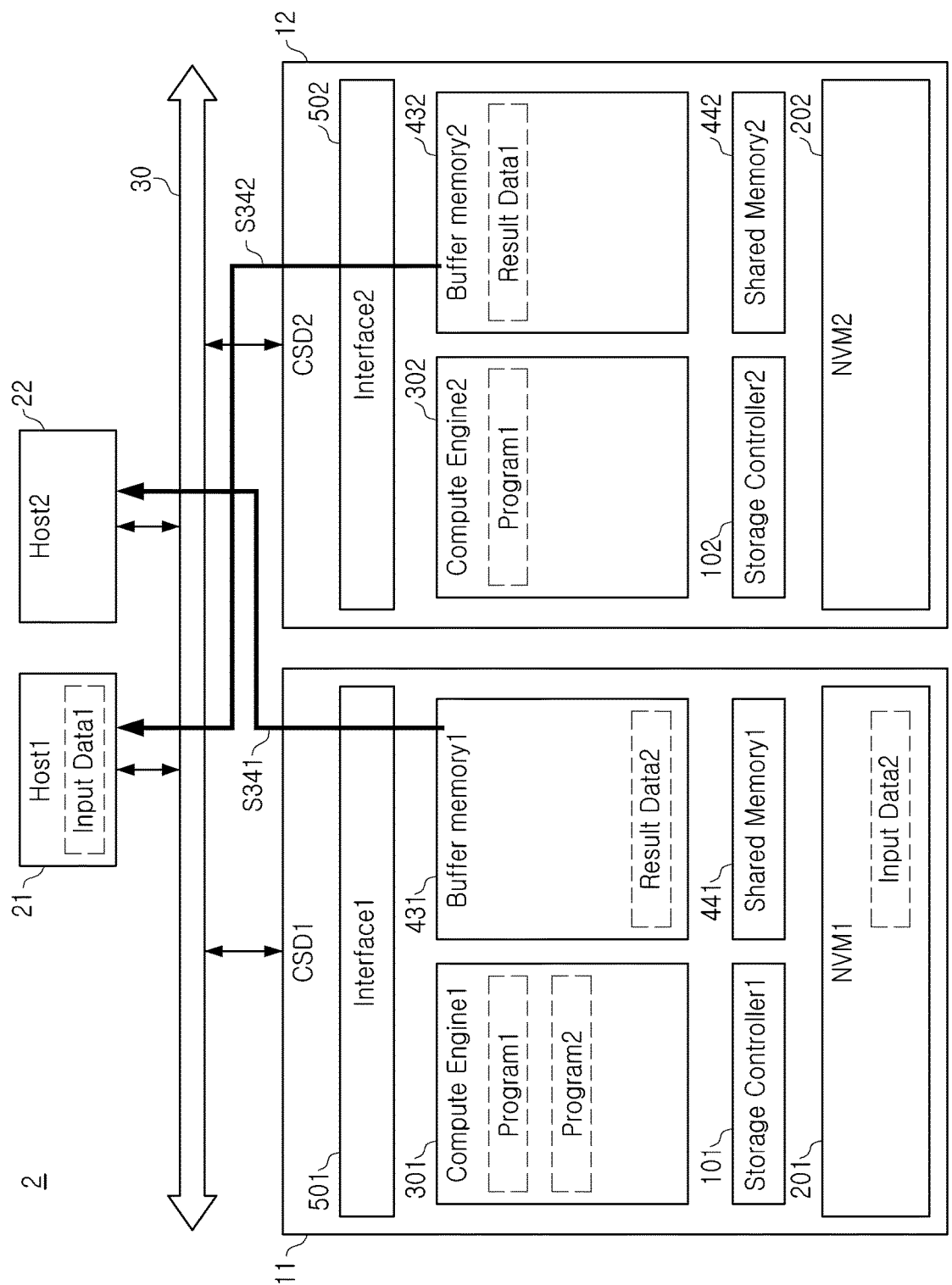

FIG. 10 illustrates a computation system 2, as described with reference to FIG. 6.

Operations S341 and S342 of FIG. 10 may be related to operation S34 described with reference to FIG. 5.

In operation S341, the first computational storage device 11 may provide second result data Result Data2 generated by completing processing of an indirect usage request to the second host 22.

For example, when the first computation engine 301 completes a computation on second input data, data generated by performing a computation on the second input data may be stored in the first buffer memory 431 as second result data. The first computation engine 301 may store the second result data in a second host memory region of the second host 22 with reference to an indirect usage request from the second host 22. The second host 22 may acquire the second result data by accessing the second host memory region.

In operation S342, the second computational storage device 12 may provide first result data generated by completing processing of a direct usage request to the first host 21.

For example, when the second computation engine 302 completes a computation on first input data, data accumulated as first intermediate data may be stored in the second buffer memory 432 as first result data Result Data1. The second computation engine 302 may store the first result data in a first host memory region determined with reference to computation information acquired from the first computational storage device 11. In addition, the first host 21 may acquire the first result data by accessing the first host memory region.

According to an embodiment, an indirect usage request for second input data that may be executed only on the first computational storage device 11 may be processed without waiting for completion of a direct usage request executing on the first computational storage device 11. In addition, since the direct usage request executing in the first computational storage device 11 may be processed in the second computational storage device 12, the direct usage request may also be processed without waiting for the completion of the indirect usage request.

Therefore, the computation system 2 may efficiently use the processing resources of the computational storage devices 11 and 12 to quickly process competing the direct usage request and the indirect usage request.

According to an embodiment described with reference to FIGS. 6 to 10, it is illustrated that, when the first computational storage device 11 transmits a direct usage request to the second computational storage device 12, the first computational storage device 11 transfers the first input data to the second computational storage device 12, but the present inventive concept is not limited thereto.

Figure 11:
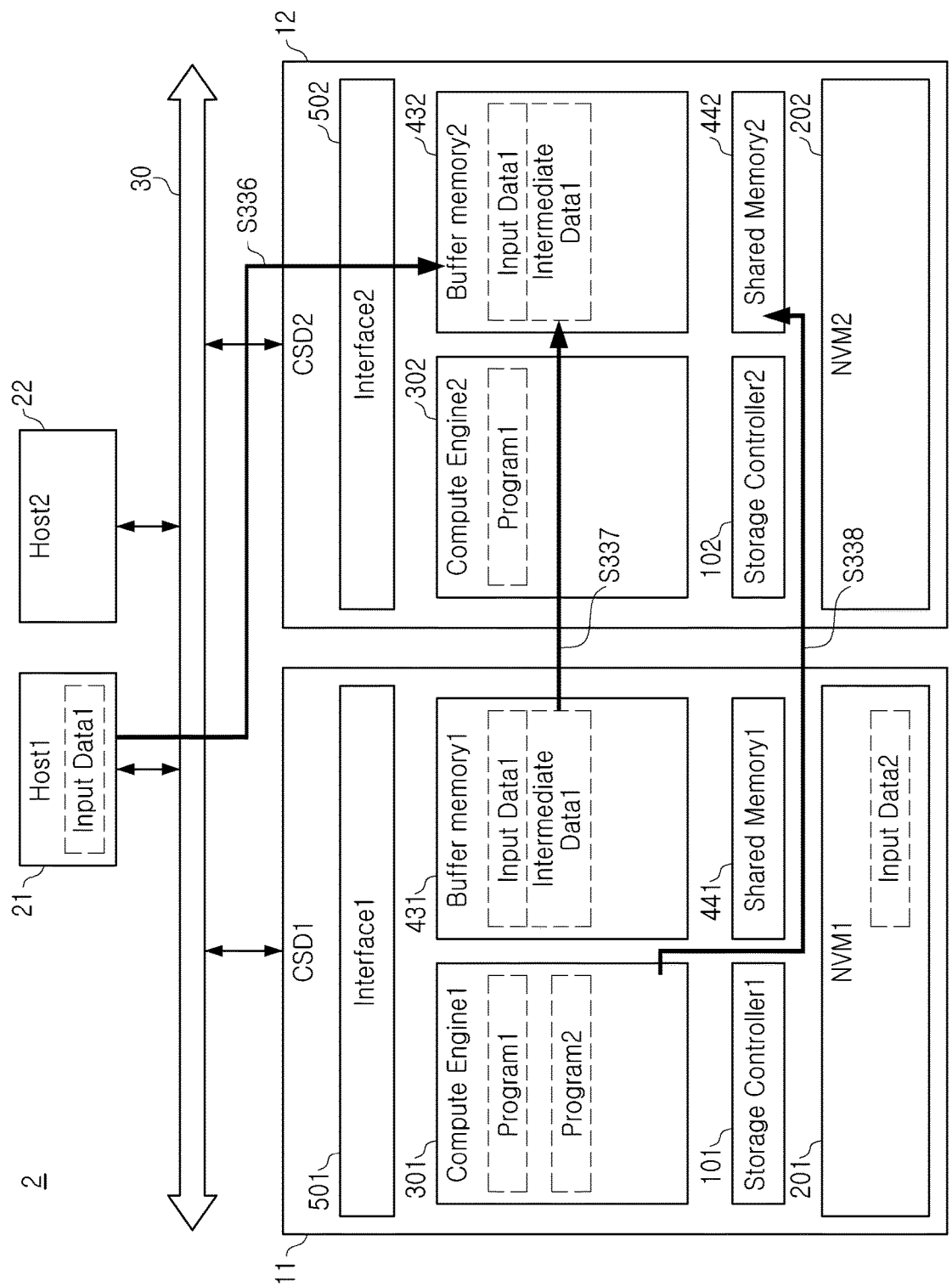
FIG. 11 is a block diagram illustrating an operation of a computation system according to an embodiment.

FIG. 11 is a block diagram illustrating an operation of a computation system according to an embodiment.

FIG. 11 illustrates the computation system 2, as described with reference to FIG. 5.

Operations S336 to S338 of FIG. 11 may be related to operation S33 described with reference to FIG. 5. Unlike as described with reference to FIG. 9, when the first computational storage device 11 transmits a direct usage request to the second computational storage device 12, first input data may be provided from the first host 21 to the second computational storage device 12.

In operation S336, the first host 21 may provide first input data, identical to first input data provided to the first computational storage device 11, to the second computational storage device 12, in response to a request from the first computation engine 301. For example, the first computational storage device 11 may provide a request to the first host 21, to provide first input data stored in a host memory to the second computational storage device 12. The second computational storage device 12 may store first input data in an allocated region of the second buffer memory 432.

In operation S337, the first computation engine 301 may provide first intermediate data stored in a first buffer memory 431 to an allocated region of the second buffer memory 432. As described with reference to FIG. 8, the first computation engine 301 may provide first intermediate data to the second buffer memory 432 by performing direct memory access in a P2P manner.

In operation S338, the first computation engine 301 may provide request information related to the direct usage request to the second shared memory 442.

When the first computational storage device 11 receives an indirect usage request while performing a direct usage request, there may be no different computational storage device in the computation system 2 that may perform the direct usage request instead. For example, all remaining computational storage devices of the computation system 2 may be in a busy state, or may be in a state in which a target program of the direct usage request is not provided in computational storage devices, which are in an idle state.

According to an embodiment, when there is no different computational storage device that may perform the direct usage request instead, the first computational storage device may perform the indirect usage request, prior to the direct usage request.

Figure 12:
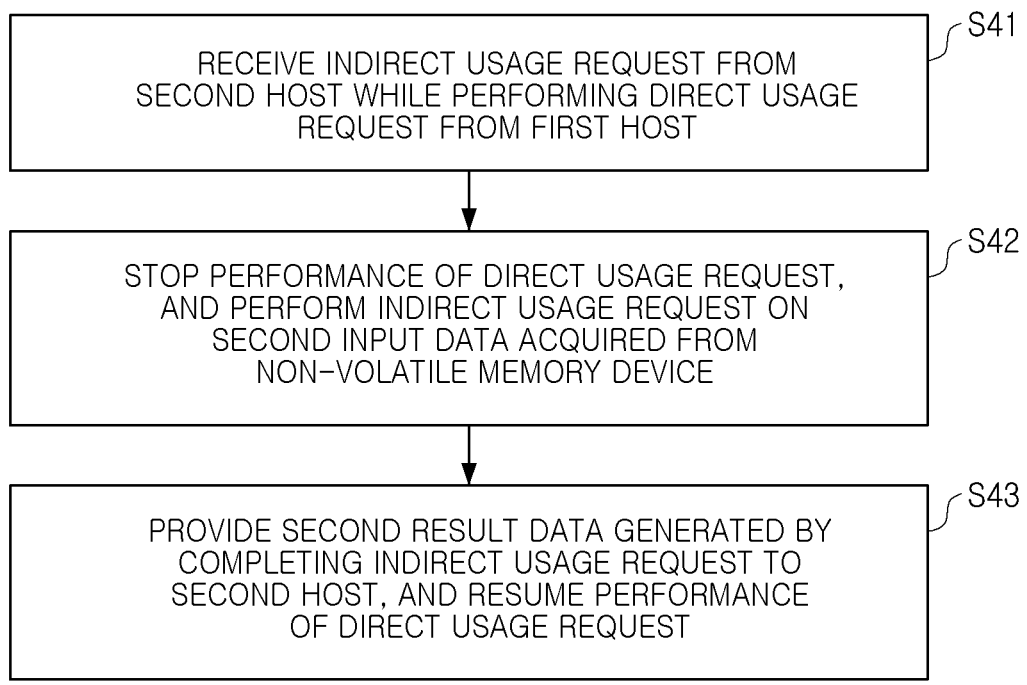
FIG. 12 is a flowchart illustrating an operation of a computation system according to an embodiment.

FIG. 12 is a flowchart illustrating an operation of a computation system according to an embodiment. For example, operations illustrated in FIG. 12 may be performed in the first computational storage device 11, as described with reference to FIG. 4.

Referring to FIGS. 4 and 12, in operation S41, the first computational storage device 11 may receive an indirect usage request from the second host 22 while performing a first computation according to a direct usage request from the first host 21. Operation S41 is illustrated in detail with reference to FIG. 13.

In operation S42, the first computational storage device 11 may stop performance of the direct usage request, and may perform an indirect usage request on second input data acquired from a non-volatile memory device included in the first computational storage device 11. Operation S42 is illustrated in detail with reference to FIG. 14.

In operation S43, the first computational storage device 11 may provide second result data generated by completing the indirect usage request to the second host 22, and may resume performance of the stopped direct usage request. Operation S43 is illustrated in detail with reference to FIG. 15.

Figure 13:
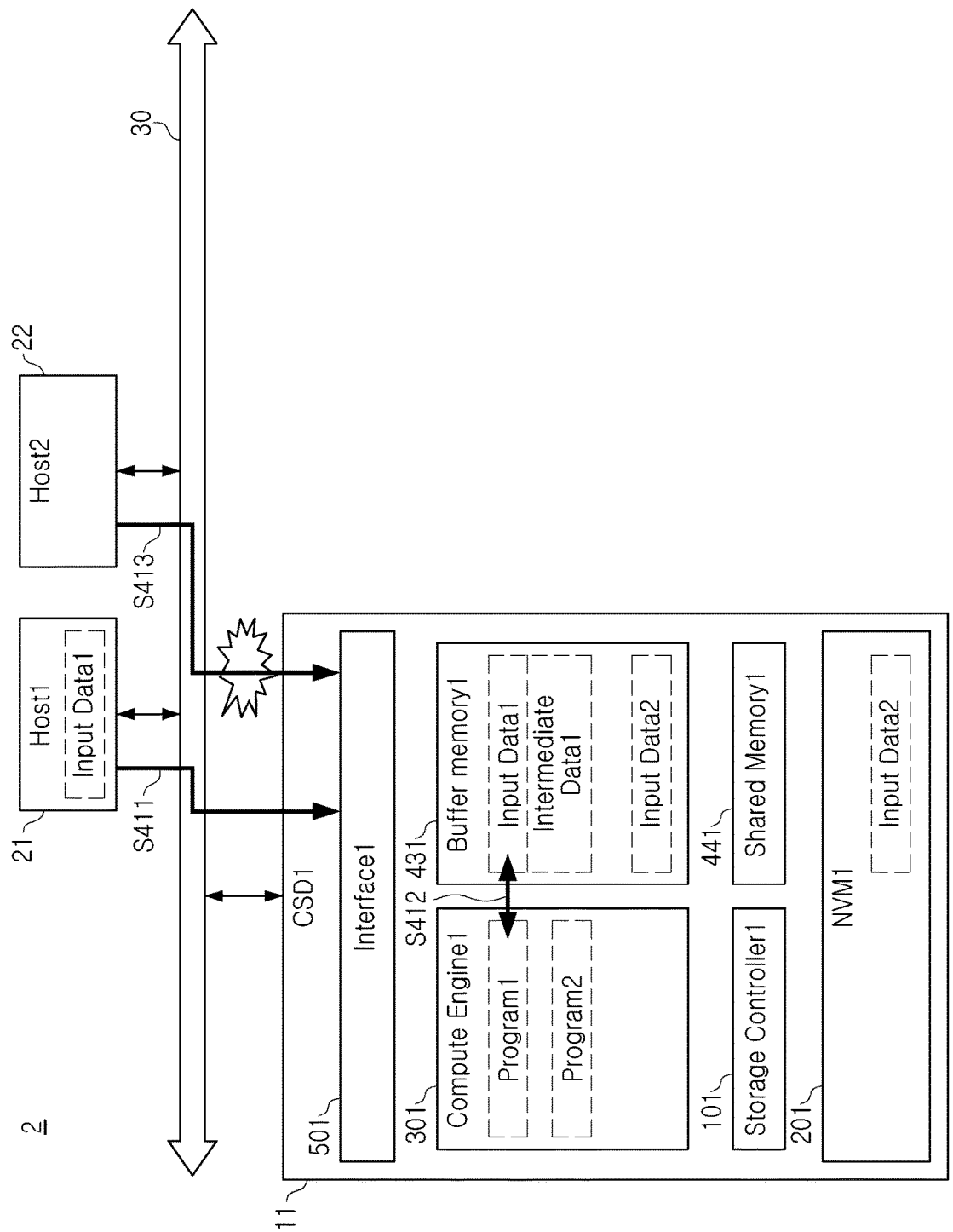
FIGS. 13 to 15 are block diagrams illustrating an operation of a computation system according to an embodiment.
Figure 14:
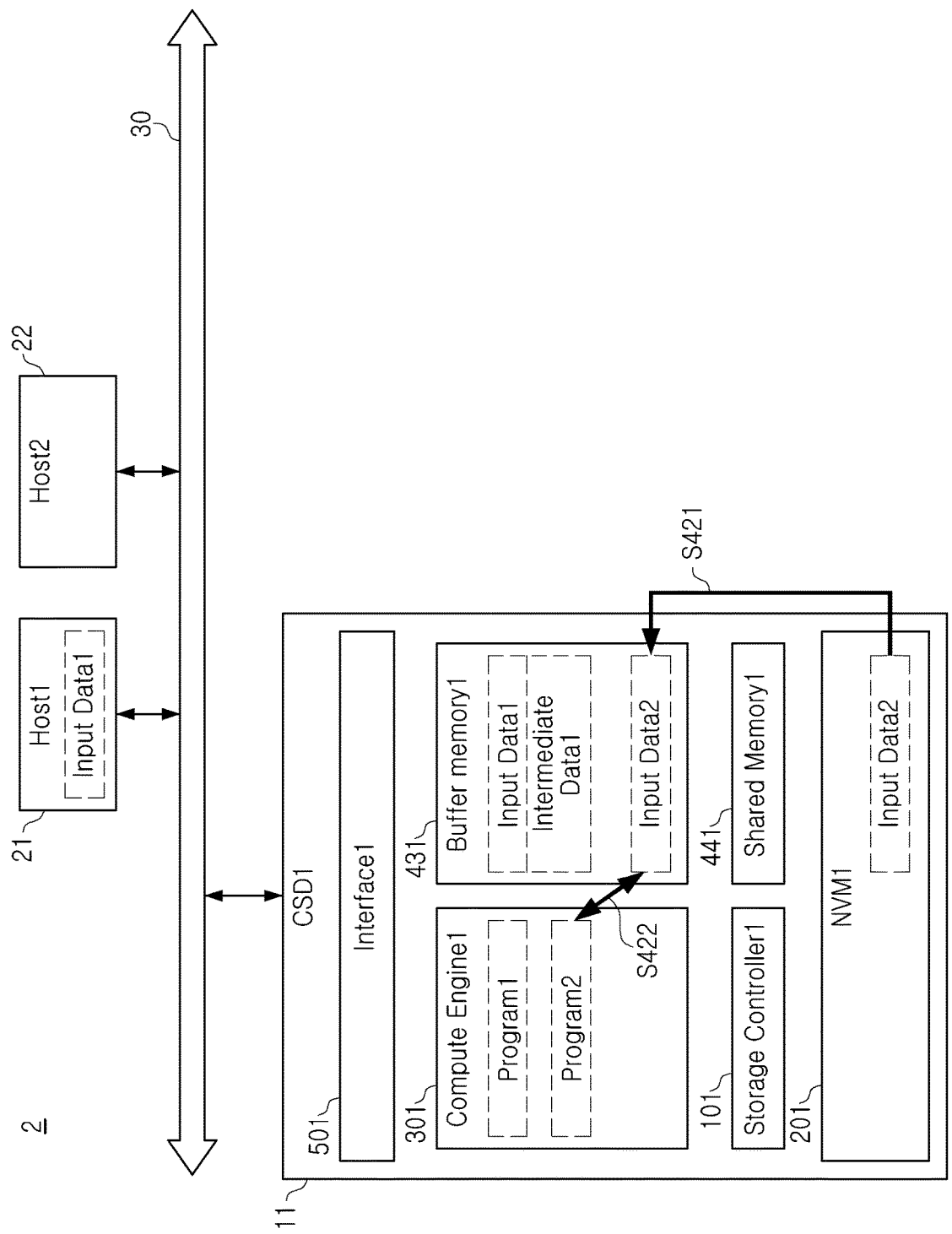
Figure 15:
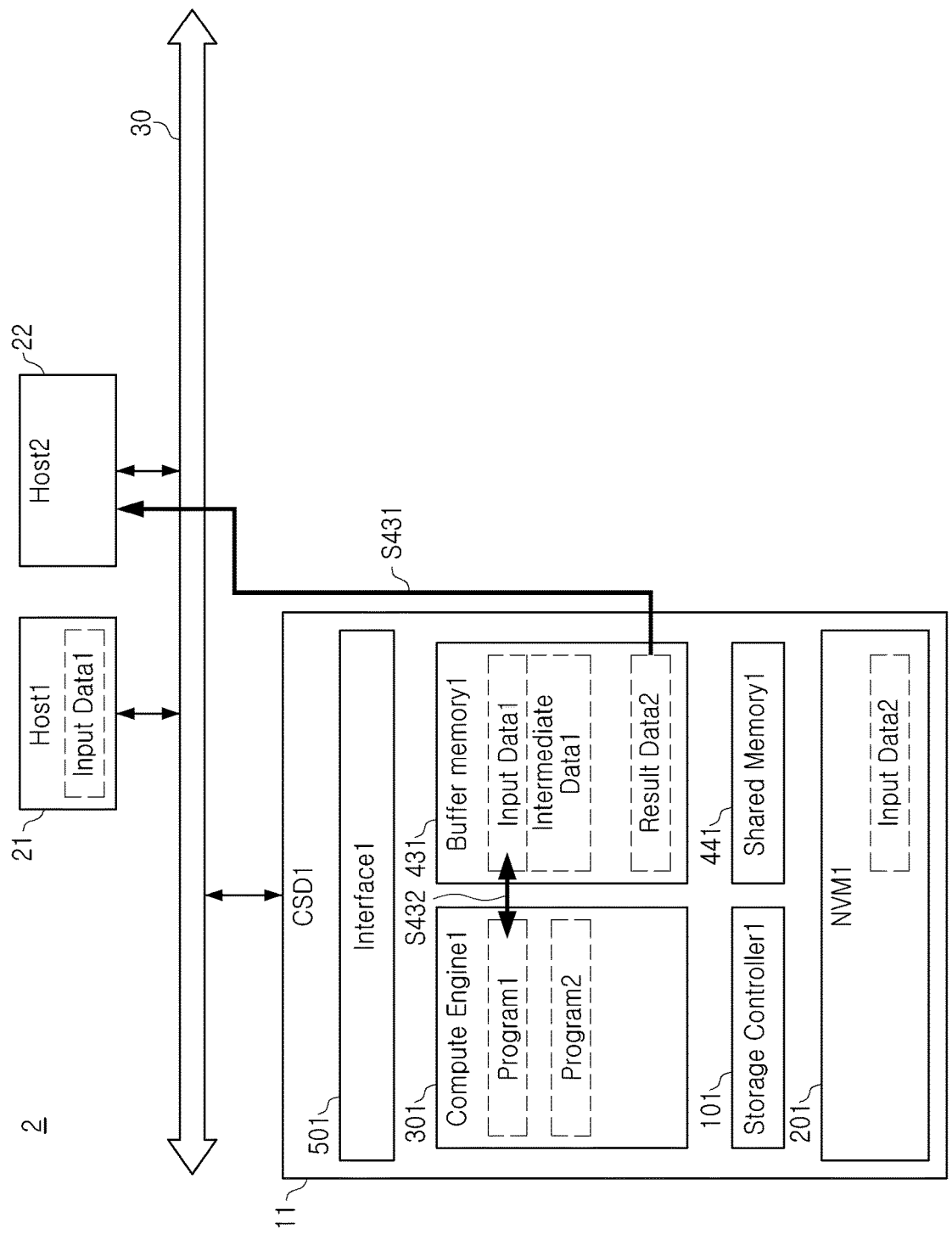

FIGS. 13 to 15 are block diagrams illustrating an operation of a computation system according to an embodiment.

FIG. 13 illustrates a portion of a configuration of the computation system 2, as described with reference to FIG. 4. FIG. 13 illustrates the first host 21, the second host 22, the first computational storage device 11, and the interface switch 30.

In operation S411, the first host 21 may provide a direct usage request and first input data Input Data1 to the first computational storage device 11. First input data may be stored in an allocated region of the first buffer memory 431.

In operation S412, the first computation engine 301 may perform a first computation for the first input data stored in the allocated region of the first buffer memory 431. First intermediate data Intermediate Data1 generated in performing the first computation by the first computation engine 301 may be stored in the allocated region of the first buffer memory 431.

In operation S413, the first computational storage device 11 may receive an indirect usage request for second input data Input Data2 stored in the first non-volatile memory device 201 from the second host 22. In an embodiment, the computation system 2 does not have a different computational storage device that may perform the direct usage request instead.

According to an embodiment, the first computational storage device 11 may stop the direct usage request, which is being performed, and may perform the indirect usage request first.

FIG. 14 illustrates a portion of a configuration of the computation system 2, as described with reference to FIG. 13.

In operation S421, second input data stored in the first non-volatile memory device 201 may be stored in an allocated region of the first buffer memory 431. For example, the storage controller 101 may load the second input data stored in the first non-volatile memory device 201 into the first buffer memory 431.

In operation S422, the first computation engine 301 may stop performance of a first request, and may execute a second program Program2 for performing an indirect usage request, thereby performing a second computation on second input data of the first buffer memory 431.

FIG. 15 illustrates a portion of a configuration of the computation system 2, as described with reference to FIG. 13.

In operation S431, second result data generated by performing a second computation for second input data may be provided to the second host 22. For example, the first computation engine 301 may store the second result data in an allocated region of the first buffer memory 431. In addition, in response to an indirect usage request, the first storage controller 101 may provide second result data Result Data2 stored in the allocated region of the first buffer memory 431 to a designated host memory region of the second host 22.

In operation S432, the first computation engine 301 may resume a stopped first computation. First input data and first intermediate data Intermediate Data1 stored in the allocated region of the first buffer memory 431 may be maintained, until the first computation resumes.

In a state in which the direct usage request stops, a different computational storage device of the computation system 2 may perform the direct usage request. For example, a computational storage device may be converted from a busy state to an idle state, or may include a program for performing a first computation in a computational storage device.

In an embodiment, when a different computational storage device capable of performing the first computation is sensed, the first computational storage device 11 may provide a stopped first computation to the different computational storage device.

According to an embodiment, when a request having an indirect usage model and a request having a direct usage model compete, a computational storage device may process the request having the indirect usage model first, and may provide the request having the direct usage model to a different computational storage device. As a result, computational requests may be processed quickly and processing resources of the computational storage devices may be efficiently used.

According to an embodiment, when a request having an indirect usage model and a request having a direct usage model compete in a computational storage device, the request having the indirect usage model may be processed first, and the request having the direct usage model may be provided in a different computational storage device. Since competing computational requests may be processed in parallel, the computational requests may be processed quickly, and processing resources of computational storage devices included in a computation system may be used efficiently.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A computational storage device, comprising:
an interface that exchanges a signal with a first external source;
a non-volatile memory device;
a storage controller that controls the non-volatile memory device;
a device memory; and
a computation engine that processes data loaded on the device memory,
wherein the interface receives, while performing a first computation for first input data acquired from the first external source, an indirect usage request from a second external source, instructing the computation engine to perform a second computation for second input data stored in the non-volatile memory device, and
the computation engine provides the first input data and first intermediate data generated when performing the first computation to an external computational storage device different from the computational storage device, in response to the indirect usage request, requests the first computation to the external computational storage device, performs the second computation for the second input data loaded from the non-volatile memory device to the device memory, and outputs second result data generated by completing the second computation to the second external source through the interface.

2. The computational storage device of claim 1, wherein the computation engine comprises a direct memory access (DMA) engine, and provides the first input data and the first intermediate data to the external computational storage device using the DMA engine.

3. The computational storage device of claim 1, wherein the computation engine provides the first input data and the first intermediate data to the external computational storage device by performing peer-to-peer (P2P) access defined in a peripheral component interconnect express (PCIe) or a compute express link (CXL).

4. The computational storage device of claim 3, wherein the computation engine provides a P2P command indicating a source region, which is a position in the device memory in which the first input data and the first intermediate data are stored, and a destination region in the external computational storage device in which the first input data and the first intermediate data are to be stored, to the external computational storage device.

5. The computational storage device of claim 1, wherein the computation engine requests the first computation from the external computational storage device by providing request information indicating a target program for performing the first computation, a destination region in which the first input data and the first intermediate data are to be stored, and an external host memory region for storing first result data generated in completing the first computation, to the external computational storage device.

6. The computational storage device of claim 5, wherein the computation engine provides the request information to the external computational storage device by storing the request information in a shared memory of the external computational storage device.

7. The computational storage device of claim 1, wherein the storage controller loads the second input data stored in the non-volatile memory device into the device memory, in response to the indirect usage request received from the interface, and provides a command instructing the computation engine to perform the second computation to the computation engine.

8. The computational storage device of claim 1, wherein the computation engine provides a request to the first external source to provide the first input data to the external computational storage device by the first external source.

9. The computational storage device of claim 1, wherein the interface comprises a peripheral component interconnect express (PCIe) bridge respectively connected to the storage controller and the computation engine.

10. The computational storage device of claim 1, wherein the storage controller and the computation engine are integrated into a chip.

11. A computational storage device, comprising:
an interface that exchanges a signal with a first external source;
a non-volatile memory device;
a storage controller that controls the non-volatile memory device;
a device memory; and
a computation engine that processes data loaded on the device memory,
wherein the interface receives, while performing a first computation for first input data acquired from the first external source, an indirect usage request from a second external source, instructing the computation engine to perform a second computation for second input data stored in the non-volatile memory device, and
the computation engine stops the first computation in response to the indirect usage request, performs the second computation for the second input data loaded from the non-volatile memory device to the device memory, outputs result data generated by completing the second computation to the second external source through the interface, and resumes the stopped first computation.

12. The computational storage device of claim 11, wherein, when an external computational storage device capable of performing the first computation is sensed in a state in which the first computation stops, the computation engine provides the stopped first computation to the external computational storage device.

13. The computational storage device of claim 11, wherein the device memory stores the first input data and first intermediate data generated when performing the first computation, and maintains the first input data and the first intermediate data until the stopped first computation resumes.

14. A method of operating a computation system, comprising:
receiving first input data and a direct usage request from a first host by a first computational storage device, and performing a first computation for the first input data in response to the direct usage request;
receiving, while performing a first computation for first input data acquired from the first host, an indirect usage request from a second host, for second input data stored in a non-volatile memory device of the first computational storage device;
providing the first input data, first intermediate data generated when performing the first computation, and request information for the direct usage request to a second computational storage device in response to the indirect usage request by the first computational storage device, loading the second input data from the non-volatile memory device, performing a second computation for the loaded second input data, and providing second result data generated when completing the second computation to the second host; and
performing the first computation for unprocessed data among the first input data based on the request information and the first input data by the second computational storage device, generating first result data by accumulating a first computation result of the unprocessed data to the first intermediate data, and providing the first result data to the first host.

15. The method of claim 14, further comprising:
generating comparison data by performing the first computation for a portion of processed data among the first input data by the second computational storage device, and verifying validity of the first intermediate data by determining whether a portion of the first intermediate data corresponding to the comparison data matches the comparison data.

16. The method of claim 14, further comprising:
selecting a computational storage device provided with a target program for executing the first computation, among a plurality of computational storage devices in which the first computational storage device is included in the computation system, as the second computational storage device.

17. The method of claim 14, wherein the direct usage request comprises information indicating a host memory region in which the first result data is to be stored,
wherein the method further comprises:
including information indicating the host memory region in the request information by the first computational storage device;
storing the first result data in the host memory region with reference to the request information by the second computational storage device; and
providing the first result data to the first host.

18. The method of claim 14, wherein an operation of the first computational storage device performing the second computation for the loaded second input data and an operation of the second computational storage device performing the first computation for the unprocessed data are performed in parallel.

19. The method of claim 14, wherein the computation system comprises a fabric supporting interfacing between the first computational storage device, the second computational storage device, the first host, and the second host, wherein the first computational storage device provides the first input data, the first intermediate data, and the request information to the second computational storage device through the fabric without intervention of the first host and the second host.

20. The method of claim 19, further comprising:

providing a peer-to-peer (P2P) command for the first input data and the first intermediate data to the second computational storage device by the first computational storage device; and storing the request information in a shared memory of the second computational storage device by the first computational storage device.

* * * * *